United States Patent [19]
Garner et al.

[11] Patent Number: 5,267,774
[45] Date of Patent: Dec. 7, 1993

[54] FOLDABLE AND REMOVABLE VEHICLE TOP

[75] Inventors: Rodger P. Garner, Plano, Tex.; Richard C. Essig, Loveland, Colo.; Larry W. Bell, Canton, Mich.; Alfred J. Jesperson, Shelby Township, Macomb County, Mich.; Sandy J. Emerling, Troy, Mich.; Jack H. Atabak, Clarkston, Mich.

[73] Assignees: Chrysler Corporation, Auburn Hills, Mich.; Bestop, Inc., Broomfield, Colo.

[21] Appl. No.: 978,916

[22] Filed: Nov. 19, 1992

[51] Int. Cl.⁵ .............................. B62D 25/06
[52] U.S. Cl. .................... 296/218; 296/219
[58] Field of Search ......... 296/218, 219, 138, 145

[56] References Cited

U.S. PATENT DOCUMENTS

| | | | |
|---|---|---|---|
| 3,494,659 | 2/1970 | Trenkler | 296/137 |
| 4,801,173 | 1/1989 | Trenkler | 296/218 |
| 5,009,465 | 4/1991 | Induni | 296/219 |
| 5,018,783 | 5/1991 | Chamings et al. | 296/219 |

*Primary Examiner*—Robert R. Song
*Attorney, Agent, or Firm*—W. Scott Carson

[57] ABSTRACT

A foldable and removable top for a passenger vehicle. The top includes an overhead cover member and side curtains. The overhead cover member has a support arrangement including front and rear headers, transverse bow members, and side rails. The flexible and foldable fabric of the cover member is secured at its end portions to the front and rear headers and the bow members are secured across the middle section of the fabric between the side rails. One end of each side rail is pivotally mounted to the rear header and the other, free end is releasably securable to an end of the front header. When assembled, the side rails extend between the front and rear headers to hold them in a spaced-apart, extended position with the fabric of the cover member being drawn taut therebetween. The side curtains of the top are releasably securable to the overhead cover member and are also releasably securable to the vehicle itself by a unique hook and catch arrangement.

25 Claims, 10 Drawing Sheets

FOLDABLE AND REMOVABLE VEHICLE TOP

BACKGROUND OF THE INVENTION

1. Field Of The Invention

This invention relates to the field of foldable and removable tops for vehicles and more particularly, to the field of collapsible soft tops for passenger vehicles.

2. Discussion Of The Background

Foldable and removable tops for passenger vehicles have always presented a unique challenge to designers. Not only must the tops be aesthetically appealing and able to withstand weather and high speed but they also must be capable of being easily removed from the vehicle and folded for storage when not in use. Additionally, for high performance or sports cars or really any relatively small vehicle, the folded configuration of the top must be sufficiently small and conformingly shaped to be stored in what is often a fairly small space in the vehicle's trunk.

With this in mind, the collapsible soft top of the present invention was developed.

SUMMARY OF THE INVENTION

This invention involves a foldable and removable top for a passenger vehicle. The top includes an overhead cover member and side curtains. The overhead cover member has a support arrangement including front and rear headers, transverse bow members, and side rails. The flexible and foldable fabric of the cover member is secured at its end portions to the front and rear headers and the bow members are secured across the middle section of the fabric between the side rails. One end of each side rail is pivotally mounted to the rear header and the other, free end is releasably securable to an end of the front header. When assembled, the side rails extend between the front and rear headers to hold them in a spaced-apart, extended position with the fabric of the cover member being drawn taut therebetween. To collapse the cover member, the side rails are pivoted to overlapping positions adjacent the rear header. This releases the transverse bow members wherein the fabric of the cover member can then be folded over itself into a relatively small shape and configuration for easy storage.

The side curtains of the top are releasably securable to the overhead cover member and are also releasably securable to the vehicle itself. To do so, the side curtains and vehicle have a unique hook and catch arrangement. The hook and catch arrangement includes an elongated hook member and a catch means with a channel portion to receive the hook member. In operation, the hook member is manipulated into the channel portion where it strikes an inclined, ramp member that guides the end of the hook member toward a bar catch. Continued movement of the hook member into the channel portion will depress the spring-biased, ramp member. A recess on the hook member is thereafter directed into a mating relationship with the catch bar and held firmly in place under the force of the spring-biased, ramp member.

DETAILED DESCRIPTION OF PREFERRED EMBODIMENTS

Figure 1:
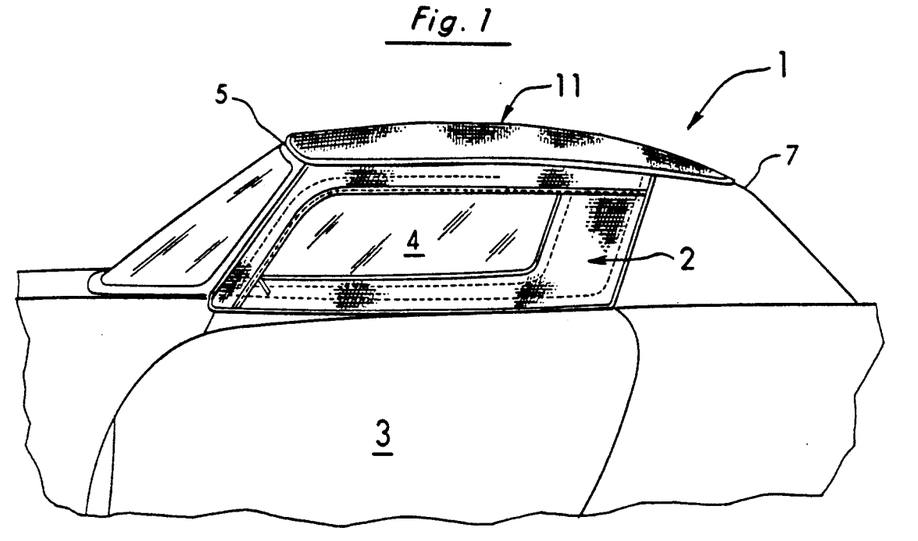
FIG. 1 illustrates the top of the present invention positioned in place of the vehicle.
Figure 2:
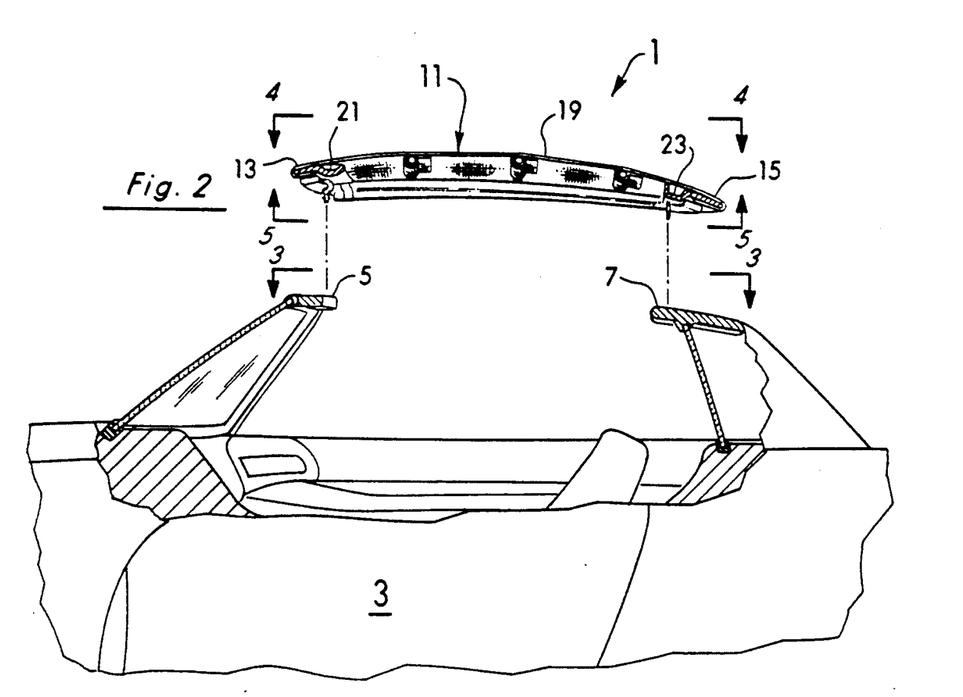
FIG. 2 is a partial cross-sectional view of the vehicle and the overhead cover portion of the top.
Figure 3:
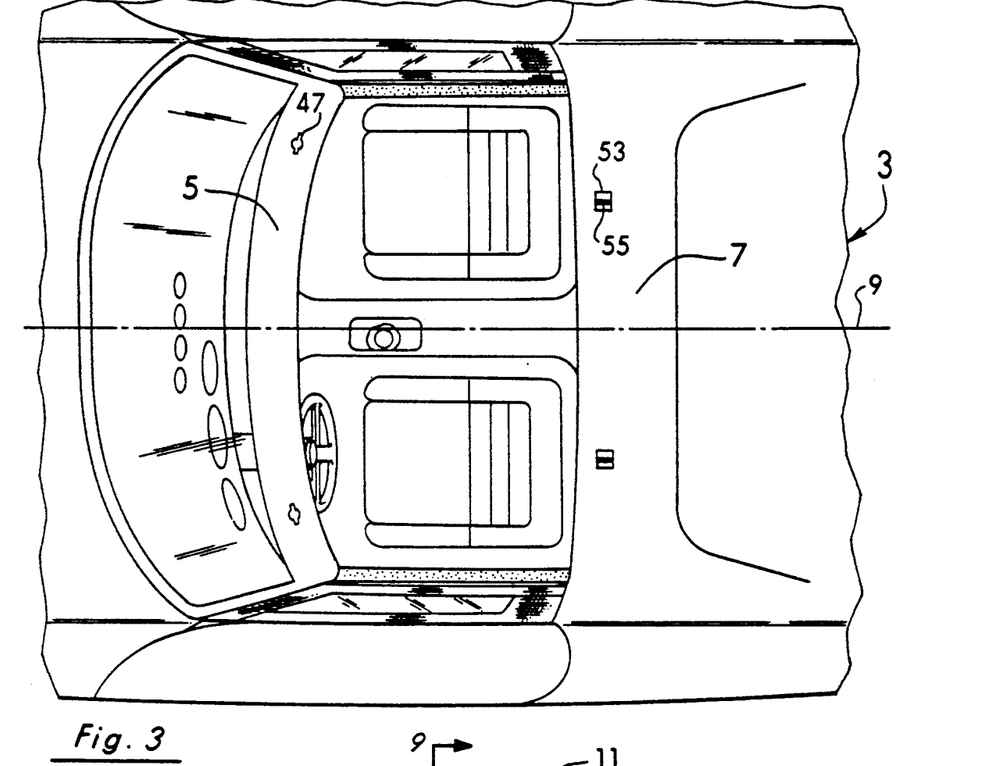
FIG. 3 is a top plan view of the vehicle without the top on it taken along line 3—3 of FIG. 2.

The foldable and removable top 1 of the present invention is primarily designed for use with a passenger vehicle 3 such as shown in FIGS. 1 and 2. The vehicle 3 has a forward windshield frame 5 and a rearward roof frame 7 with portions of these forward and rearward frames 5 and 7 extending transversely of the vehicle's central axis 9 as illustrated in FIG. 3.

Overhead Cover Portion Of The Top

The overhead portion of the top 1 (see FIG. 4) includes a substantially rectangular, cover member 11 of flexible, foldable material (e.g., vinyl, canvas) having forward and rearward sections 13 and 15. As illustrated, the forward and rearward sections 13 and 15 are spaced from each other along an axis 17 with the middle section 19 extending therebetween. Portions of the forward and rearward sections 13 and 15 of the cover member 11 are wrapped around or otherwise secured (e.g., glued) to front and rear headers 21 and 23 (see FIGS. 2 and 5). The front and rear headers 21 and 23 as shown extend transversely across the cover axis 17. A bow assembly having three elongated bow members 25 extends between the side rails 27 (see FIG. 5). The bow members 25 are releasably attached to the middle section 19 of the cover member 11 by hook and loop wraps 29 or other suitable means. The bow assembly and other hardware supporting the cover member 11 are best seen in the exploded view of FIG. 6. This support hardware includes the front and rear headers 21 and 23, bow members 25, and side rails 27.

Figure 5:
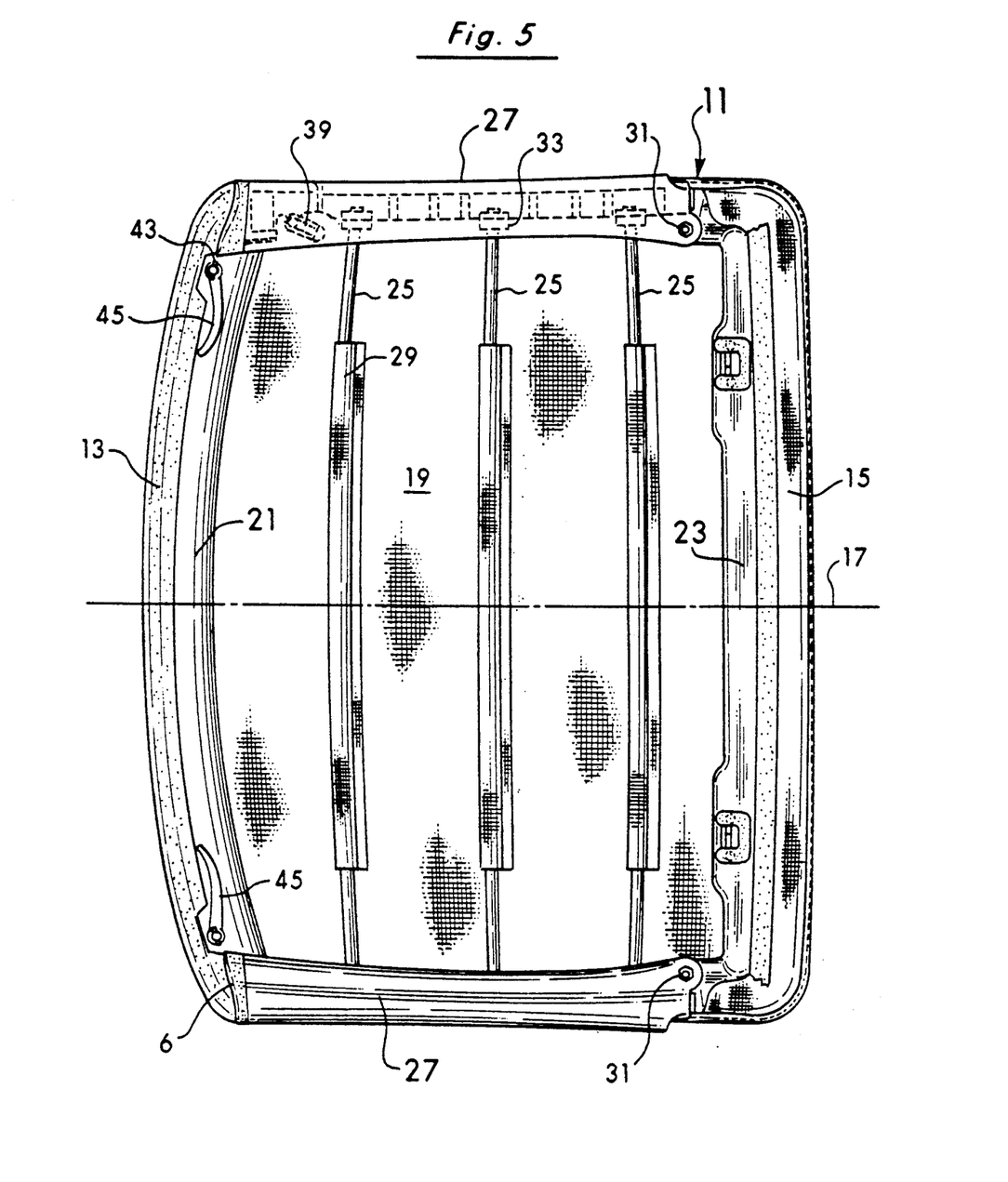
FIG. 5 is an underneath view of the overhead cover portion taken along line 5—5 of FIG. 2.
Figure 6:
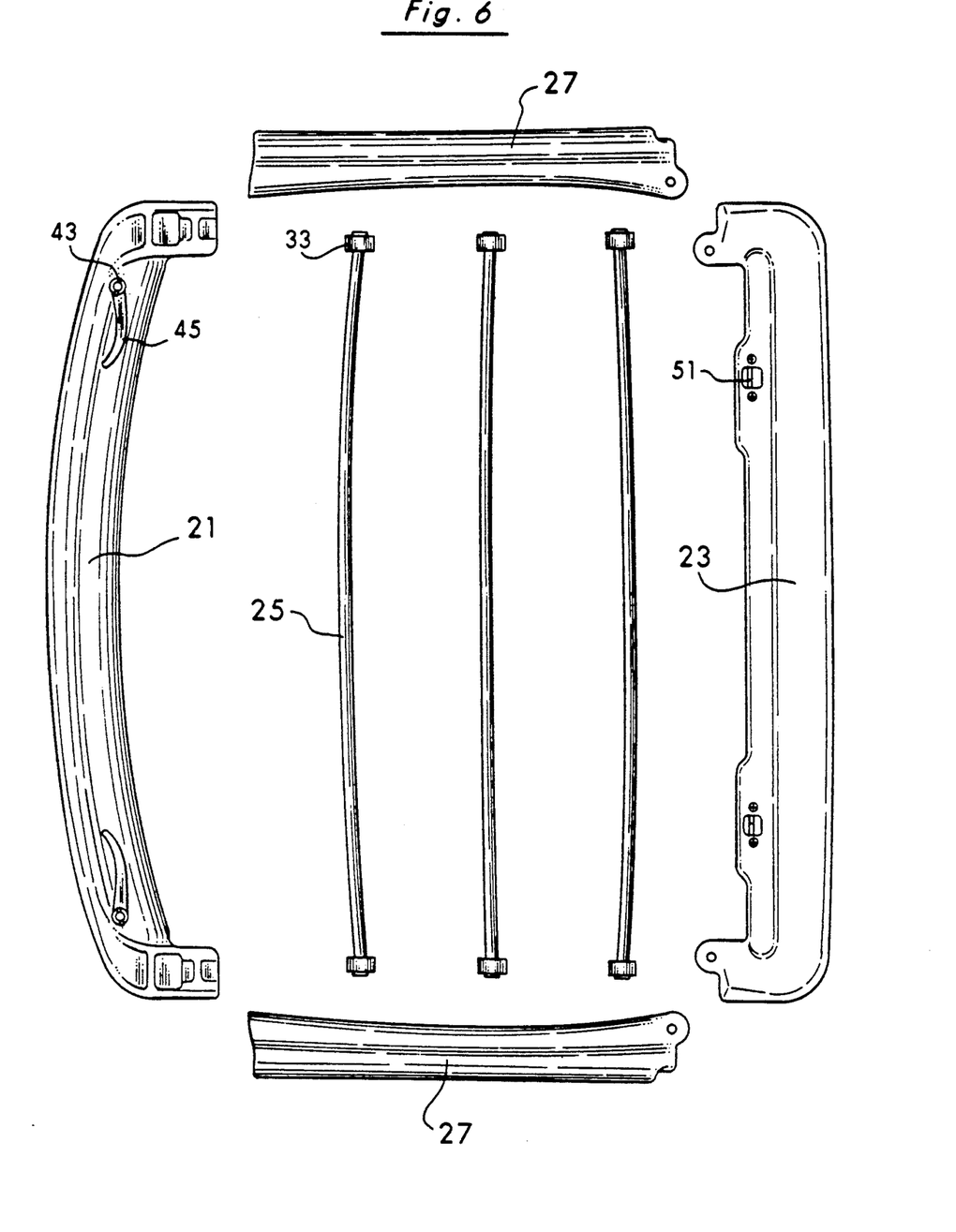
FIG. 6 is an exploded view of the support hardware for the overhead cover portion of the top.

The pair of side rails 27 are pivotally mounted at 31 in FIG. 5 to the rear header 23 for movement about respective axes 31 which are substantially perpendicular to the cover axis 17. In use in the position of FIG. 5, the side rails 27 extend between the front and rear headers 21 and 23 to hold them in a spaced-apart, extended position. In this position, the middle section 19 of the cover member 11 is drawn substantially taut between the front and rear headers 21 and 23. Also, in this position, the ends 33 of the bow members 25 are secured in place in the side rails 27.

Figure 4:
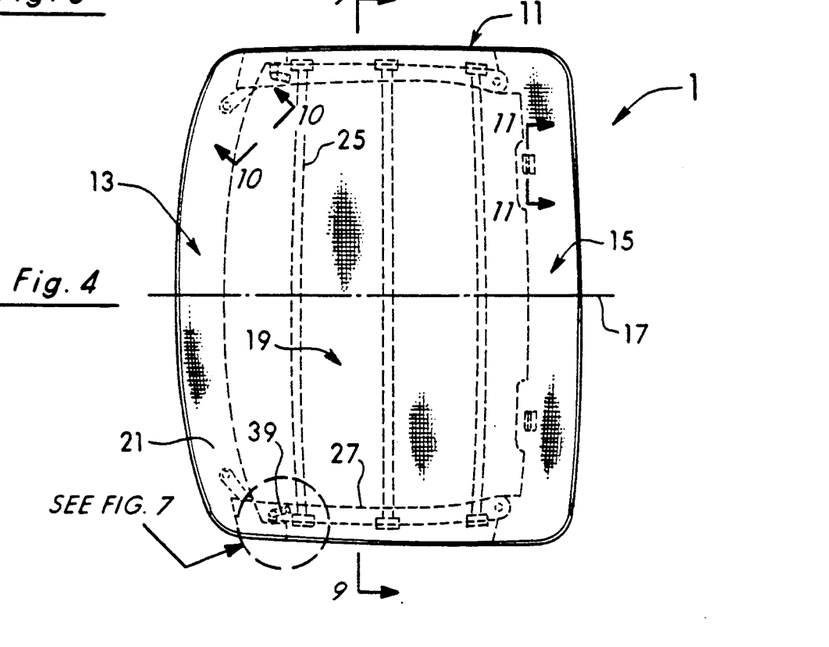
FIG. 4 is a top plan view of the overhead cover portion of the top taken along line 4—4 of FIG. 2.
Figures 7, 8, 9:
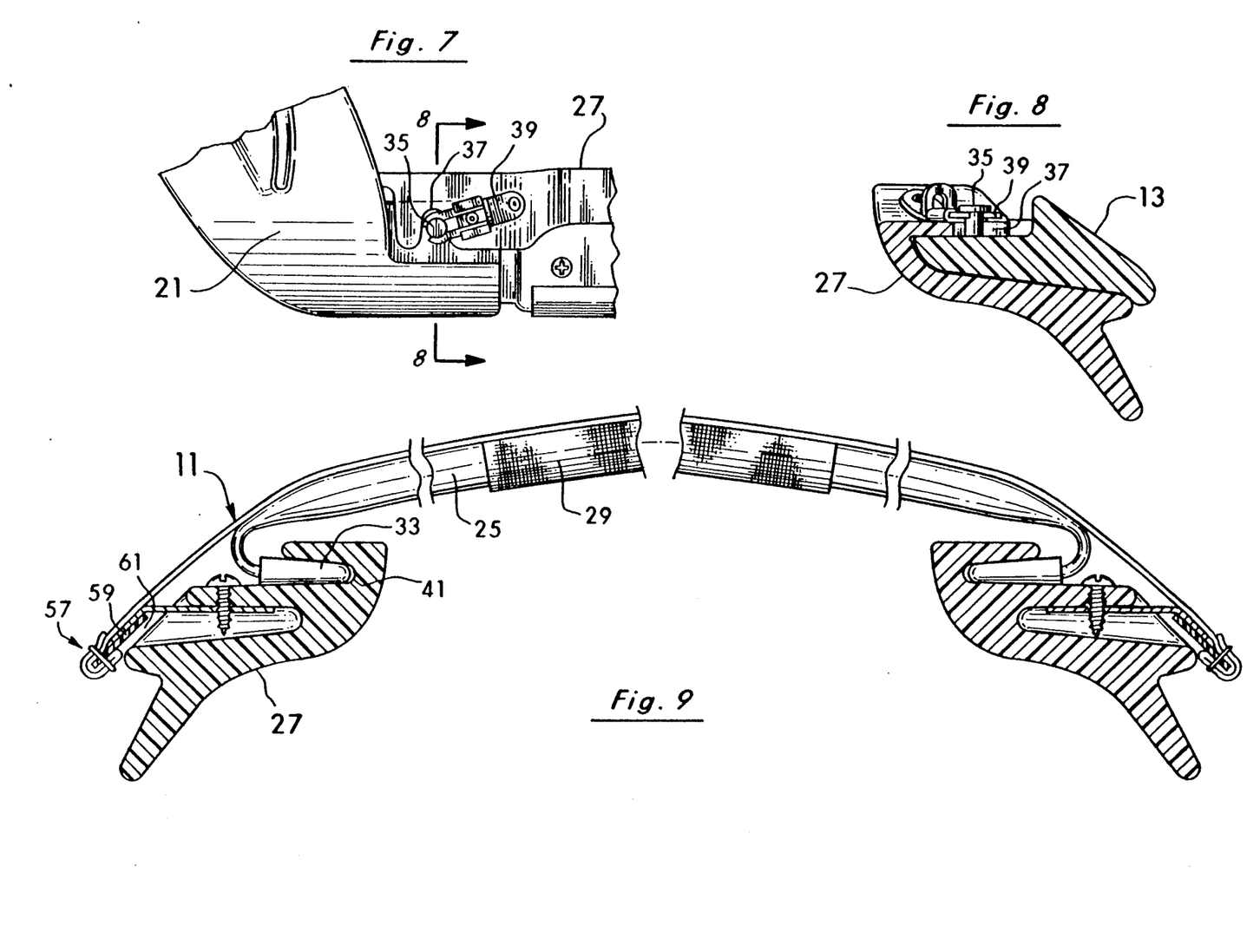
FIG. 7 is a view taken from a portion of FIG. 4 illustrating the securing means between the front header and a side rail.
FIG. 8 is a view taken along line 8—8 of FIG. 7.
FIG. 9 is a view taken along line 9—9 of FIG. 4.

In the extended position of the cover member 11, the forward or free ends of the side rails 27 can be removably secured to the front header 21 in any number of manners. In one such manner as shown in FIGS. 4, 7, and 8, portions of the front header 21 and each side rail 27 mate. To hold this position, post 35 on header 21 is received in the slot 37 on rail 27 wherein the clip 39 can then be manually manipulated to slide along its axis to the position of FIGS. 7 and 8 to clamp the post 35 in place. In this extended position of the cover member 11 in which the side rails 27 are secured between the front and rear headers 21 and 23, the ends or tongue portions 33 of the bow members 25 are secured in the mating grooves 41 of the side rails 27 (see FIG. 9).

Figure 10:
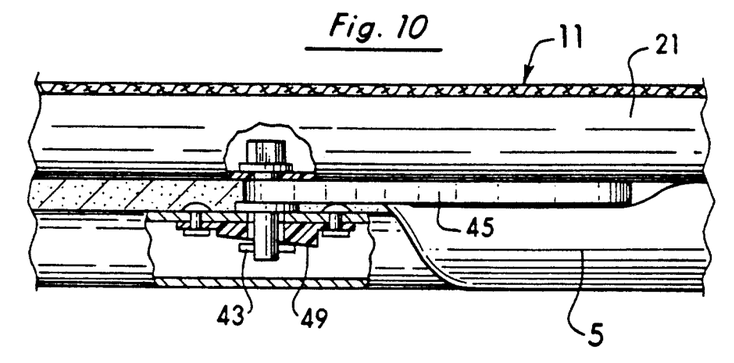
FIG. 10 is a view taken along line 10—10 of FIG. 4 showing the manner in which the overhead cover portion of the top is secured to the forward windshield frame of the vehicle.
Figure 11:
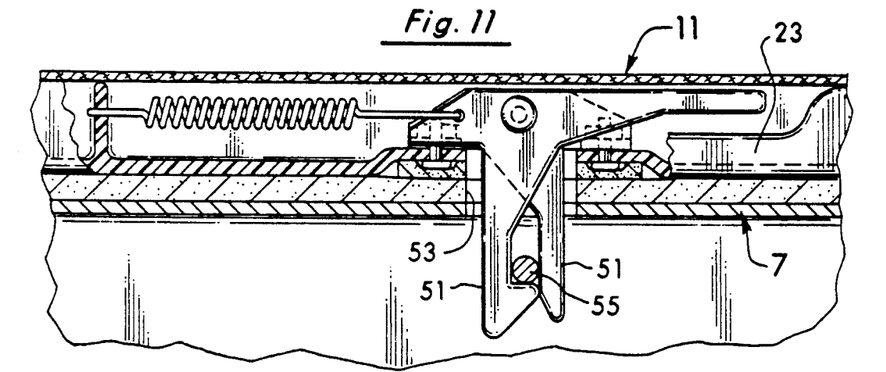
FIG. 11 is a view taken along line 11—11 of FIG. 4 showing the manner in which the overhead cover portion of the top is secured to the rearward roof frame of the vehicle.

FIGS. 10 and 11 illustrate manners in which the cover member 11 of the top 1 can be removably attached to the front windshield frame 5 and the rearward roof frame 7. In FIG. 10, a simple cam-latch arrangement is shown. With it, the cross pin 43 on the lever arm 45 (see also FIGS. 5 and 6) can be received in the corresponding pin slots 47 in the forward windshield frame 5 (see FIG. 3). The lever arm 45 on the forward header 21 can thereafter be rotated in a known manner to move the cross pin 43 against the cammed surface at 49 (see FIG. 10) to draw the front header 21 of the cover member 11 tightly and securely against the forward windshield frame 5. The rear header 23 of the cover member 11 can also be operated to removably attach the rear of the cover member 11 to the rearward roof frame 7. In the illustrated way of FIG. 11, a spring-biased clip arrangement of levers 51 is received in one of the slots 53 (see FIG. 3) in the rearward roof frame 7. When the rear header 23 is then depressed, the levers 51 clip about the horizontal post 55 extending across the slot 53 in the rearward roof frame 7.

Figure 12:
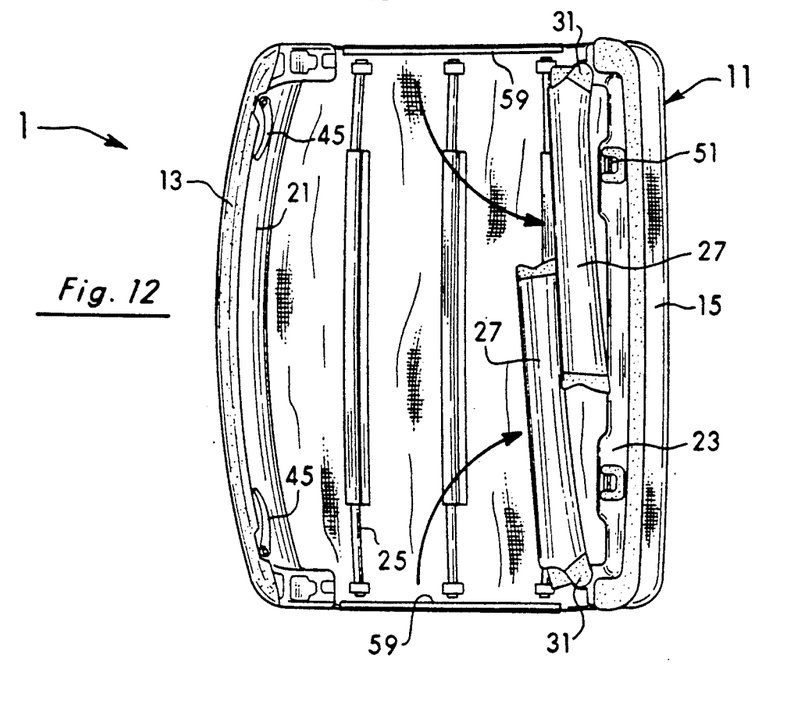
FIG. 12 is a view similar to FIG. 5 showing the side rails pivoted to positions adjacent each other and the rear header.

The top 1 of the present invention as discussed above is foldable and removable from the vehicle 3. The folding procedure is accomplished by first releasing the forward, free ends of the side rails 27 from the front header 21. This is done by simply sliding the clip 39 in FIG. 7 to the right to release its lock on the post 35. The clip 39 on the other side rail 27 is similarly released. Once so released, the side rails 27 are pivoted about pivot axes 31 in FIG. 12 preferably to the retracted positions shown wherein portions of each side rail 27 are overlapping and extend along the rear header 23. The cover member 11 can then be folded in any number of manners such as the one illustrated in FIG. 13. In this folding procedure, the front header 21 in FIG. 12 is simply lifted to extend the cover member 11 vertically and as the front header 21 is lowered, portions of the cover member 11 are folded over themselves to the position of FIG. 13. The cover member 11 is then in a relatively compact configuration for easy storage.

Figure 13:
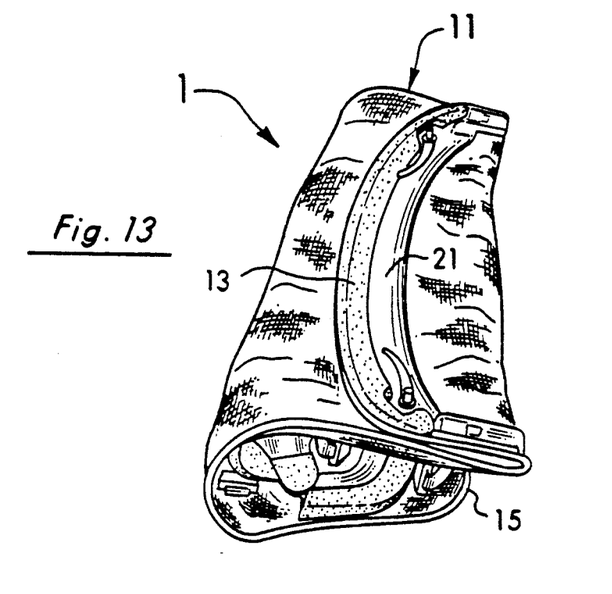
FIG. 13 illustrates the overhead cover portion of the top in a compact, folded position.

To extend the cover member 11, this process is simply reversed wherein the cover member 11 of FIG. 13 is opened and the side rails 27 in FIG. 12 are swung outwardly to their extended positions. In doing so, the ends 33 of the bow members 25 are received in the respective grooves 41 (see FIG. 9). Once extended with the forward, free ends of side rails 27 mating with the ends of the front header 21 (see FIG. 7), the clips 39 are extended to lock the side rails 27 in place. Additionally, the side edge portions of the cover members 11 are secured at 57 in FIG. 9 to side rails 27 preferably by a belt and groove arrangement 59 and 61 such as disclosed in U.S. Pat. No. 4,757,854. Once extended, the cover member 11 can be secured as discussed above to the vehicle 3 by the mechanisms of FIGS. 10 and 11.

Side Curtain Portions Of The Top

Figure 14:
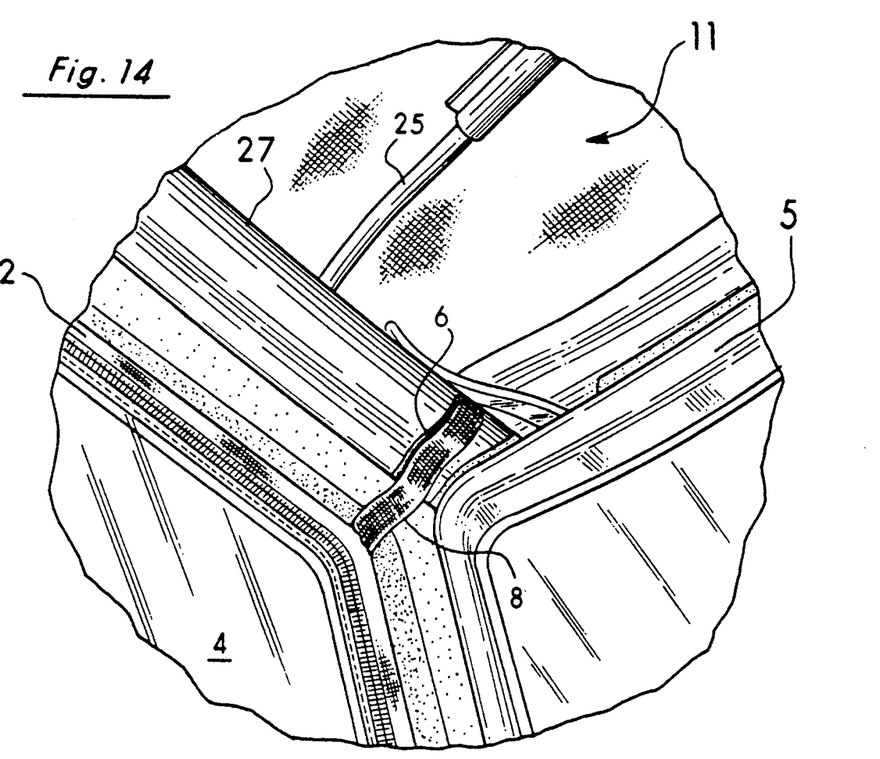
FIG. 14 is a view from the driver's side of the vehicle showing how the side curtain and overhead cover portion of the top are releasably secured to each other by hook and loop strips.

The top 1 of the present invention further includes side curtains 2 (see FIG. 1) having clear vinyl portions 4. From seated within the vehicle 3, the side curtains 2 can be secured by the driver to the cover member 11 by simple hook and loop fasteners 6 and 8 as illustrated in FIG. 14. More specifically, the cover member 11 is provided with one portion 6 of a hook and loop fastener on the forward, free end of the side rails 27. The side curtain 2 is then provided with the mating hook and loop fastener 8. In use, the strip 8 is simply pulled taut and fastened to the mating strip 6 to securely and removably attach the front of the side curtain 2 to the cover member 11 of the top 1. This is particularly useful at high speeds when the side curtains 2 tend to bow out due to the reduced, exterior air pressure on them.

Figure 15:
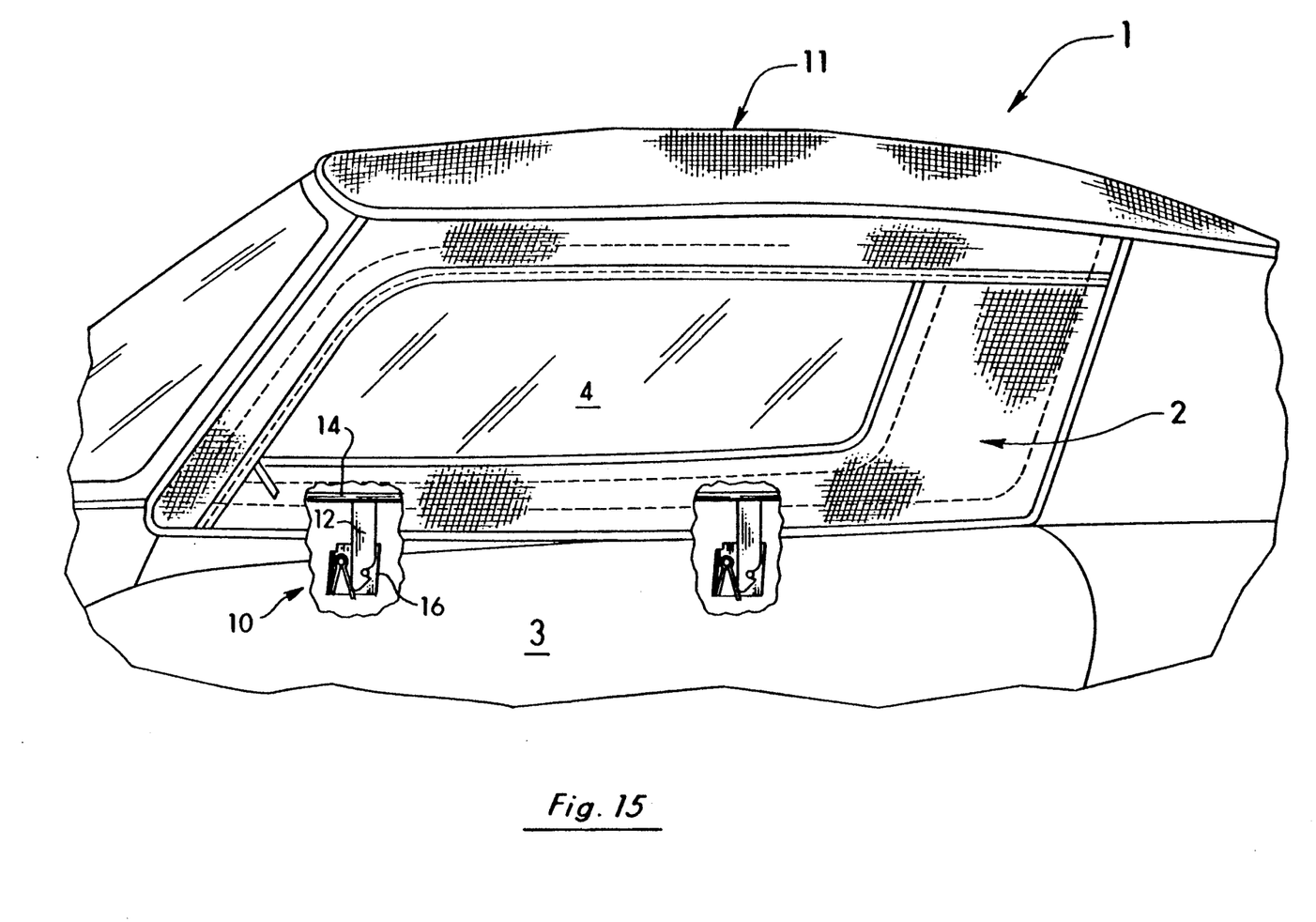
FIG. 15 illustrates the top of the present invention positioned on the vehicle with cutaways of the hook and catch arrangements releasably securing the side curtains to the vehicle.
Figures 16, 17:
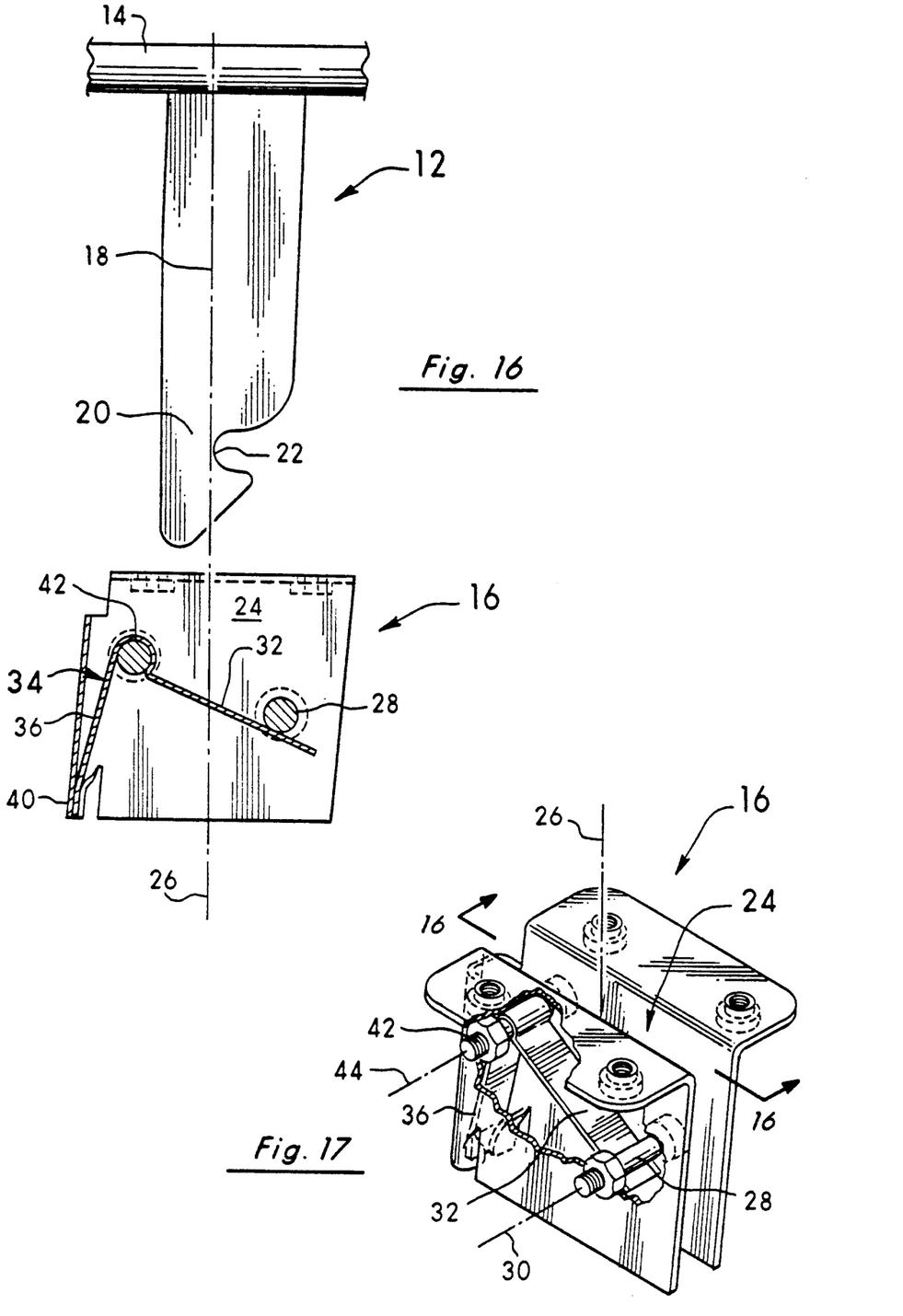
FIG. 16 is a view of one of the hook and catch arrangements.
FIG. 17 is a perspective view of the catch means.

The side curtain 2 of the top 1 is also removably secured to the vehicle 3 by a unique and hook and catch arrangement 10 as illustrated in FIG. 15. The arrangement (see FIGS. 16 and 17) includes a hook member 12 attached to the frame 14 of the side curtain 2 and a catch means 16 attached to the vehicle 3. The hook member 12 extends outwardly of the frame 14 along the axis 18 and has a hook portion at 20 with a recess 22. The catch means 16 as shown has a channel portion at 24 extending along an axis 26 which is dimensioned to receive the hook portion 20 therein.

Figure 18:
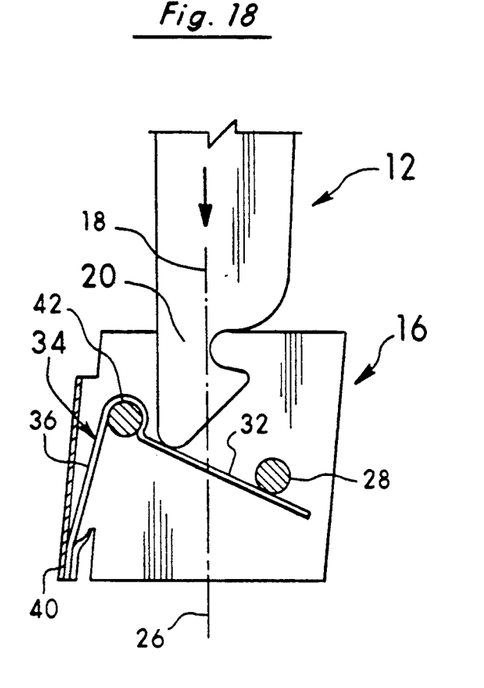
FIGS. 18-21 are sequential views of the manner in which the hook and catch members engage one another to removably secure the side curtains to the vehicle.

Within the channel portion 24 of the catch means 16, a substantially cylindrical catch bar 28 extends across the channel portion 24 and is mounted with its axis 30 (see FIG. 17) substantially perpendicular to the channel axis 26. Additionally, a guiding ramp member 32 is provided (see FIGS. 16-18) which is spring biased toward the position of FIGS. 16-18. The ramp member 32 is supported as shown to extend substantially across the channel portion 24 at an inclined angle (e.g., 45 degrees) to the channel axis 26. More specifically, the ramp member 32 in the preferred embodiment is one leg of a substantially V-shaped spring 34 which is supported as illustrated with the other leg 36, held against the back channel wall 40 (e.g., by crimping). The V-shaped spring 34 is supported about pin 42 in an inverted V-shape with the ramp leg 32 extending substantially across the channel portion 24.

Figure 19:
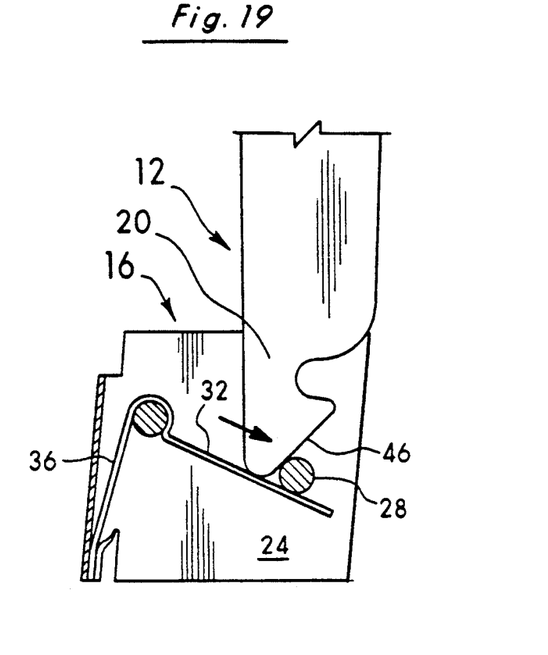
Figure 20:
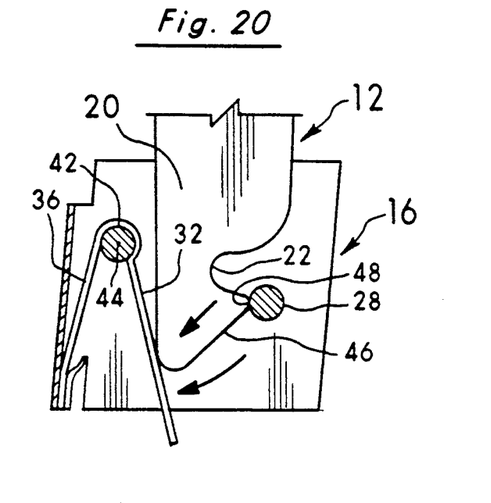
Figure 21:
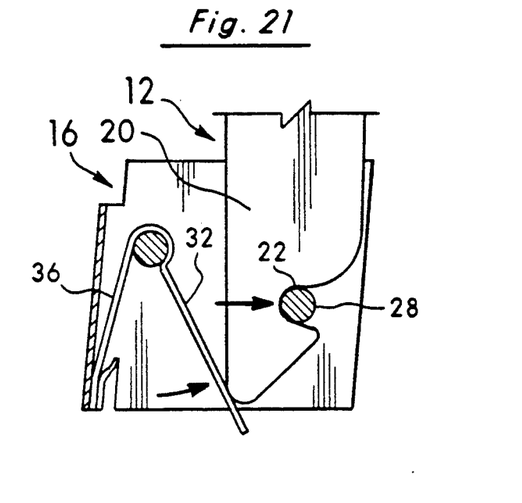

In operation, the side curtain 2 is manually manipulated to extend the hook portion 20 of hook member 12 into the channel portion 24 (see FIG. 18) with the axes 18 and 26 substantially aligned or parallel. Continued downward movement of the side curtain 2 will then cause the end of the hook member 12 to contact the guiding ramp 32 and slide therealong to the right (see FIG. 19) until the inclined surface 46 of the hook portion 20 contacts the bar 28. Further downward movement of the side curtain 2 will cause the hook portion 20 to actually pivot the ramp member 32 about its axis 44 (see FIG. 20) which is substantially perpendicular to the channel axis 26 (see FIG. 17). This pivoting occurs substantially at the vertex of the inverted V-shape of member 34 about the pin 42 as the inclined surface 46 of the hook portion 20 slides against the bar 28. As the tip 48 of the hook portion 20 passes the bar 28, the spring-biased, ramp member 32 moves the hook recess 22 and bar 28 into a mating relationship (see FIG. 21) and thereafter holds the hook and catch arrangement in the secured position of FIG. 21. To release the side curtain 2, this process is essentially just reversed.

While several embodiments of the invention have been shown and described in detail, it is to be understood that various modifications and changes could be made to them without departing from the scope of the invention.

We claim:

1. A foldable and removable top primarily intended for use with a passenger vehicle having a forward windshield frame and a rearward roof frame spaced from each other along a first axis, said forward windshield frame and said rearward roof frame each having a portion extending substantially transversely across said first axis, said foldable and removable top including:
   a substantially rectangular, cover member of flexible, foldable material having forward and rearward sections spaced from each other along a second axis, said cover member having a middle section extending between said forward and rearward sections,
   front and rear headers, means for attaching said front header to said forward section of said cover member to extend substantially across said second axis, and means for attaching said rear header to said rearward section of said cover member to extend substantially across said second axis,
   a bow assembly having at least one, elongated bow member and means for attaching said bow member adjacent the middle section of said cover member with said elongated bow member extending substantially transversely across said second axis,
   a pair of side rail members and means for removably securing said side rail members between said front and rear headers to hold said front and rear headers in a spaced-apart, extended position with the middle section of said cover member substantially taut between said front and rear headers, said bow member having first and second ends and at least one of said side rail members having means for removably securing the first end of said elongated bow member to said one side rail member when said front and rear headers are in said spaced-apart, extended position with said middle section of said cover member taut therebetween, and
   means for removably attaching said front header of said top to said transversely extending portion of said forward windshield frame and means for removably attaching said rear header of said top to said transversely extending portion of said rearward roof frame with said first and second axes substantially parallel to each other.

2. The foldable and removable top of claim 1 further including means for pivotally mounting at least one of said side rail members to at least one of said front and rear headers for pivotal movement about an axis substantially perpendicular to said second axis between an extended position extending between said front and rear headers and a retracted position extending substantially along and adjacent said one of said front and rear headers.

3. The foldable and removable top of claim 2 further including means for pivotally mounting the other of said side rail members to at least one of said front and rear headers for pivotal movement about an axis substantially perpendicular to said second axis between an extended position extending between said front and rear headers and a retracted position extending substantially along and adjacent said one of said front and rear headers.

4. The foldable and removable top of claim 3 wherein said side rail members are pivotally mounted to the same one of said front and rear headers.

5. The foldable and removable top of claim 4 wherein said side rail members in said retracted positions extend along and adjacent one another.

6. The foldable and removable top of claim 5 wherein positions of said side rail members in said retracted positions overlap one another.

7. The foldable and removable top of claim 2 wherein said one side rail member has first and second end portions, said first end portion being pivotally mounted to said one of said front and rear headers by said pivot means and said second end portion having means for removably securing said second end portion to the other of said front and rear headers.

8. The foldable and removable top of claim 1 wherein said other side rail member includes means for removably securing the second end of said elongated bow member to said other side rail member when said front and rear headers are in said spaced-apart, extended position with said middle section of said cover member taut therebetween.

9. The foldable and removable top of claim 1 wherein said first end of said bow member has a tongue portion and said one side rail member has a groove portion dimensioned to receive said tongue portion of said bow member therein.

10. The foldable and removable top of claim 1 wherein said cover member has edge portions extending substantially between said front and rear headers and said one side rail member further includes means for removably securing at least one of said edge portions to said one side rail member when said front and rear headers are in said spaced-apart, extended position with said middle section of said cover member taut therebetween.

11. The foldable and removable top of claim 10 wherein said securing means for said one edge portion includes a belt and groove arrangement.

12. The foldable and removable top of claim 1 further including at least one side curtain and means for removably attaching said side curtain to said cover member.

13. The foldable and removable top of claim 12 wherein said side curtain attaching means attaches said side curtain to one of said side rail members of said top.

14. The foldable and removable top of claim 13 wherein said side curtain attaching means is a hook and loop fastener means.

15. The foldable and removable top of claim 12 further including means for removably securing said side curtain to said vehicle.

16. The foldable and removable top of claim 1 further including at least one side curtain and means for removably securing said side curtain to said vehicle.

17. A spring-biased hook and catch arrangement primarily intended for removably securing a side curtain to a vehicle, said arrangement including:
a hook member extending along an axis and having a hook portion and means for attaching said hook member to one of said side curtain and said vehicle with said hook portion extending outwardly thereof along the axis of said hook member and
catch means and means for attaching said catch means to the other of said side curtain and said vehicle, said catch means having a channel portion extending along an axis and dimensioned to receive said hook portion therein, said hook portion having a recess therein and said catch means having a catch bar extending along an axis and dimensioned to be received within the recess of said hook portion in a mating relationship, said catch means further including means for supporting said bar with the axis thereof substantially perpendicular to said channel axis and said bar extending substantially across said channel portion, said catch means having means for guiding said hook portion toward said bar to mate said recess and said bar as the hook portion of said hook member is received in said channel portion and moved therealong with the axes of said hook member and said channel portion substantially parallel, said guiding means including a ramp member and means for supporting said ramp member for movement between a first position extending substantially across said channel portion at a first inclined angle to the axis of the channel portion and a second position, said supporting means further including spring means for biasing said ramp member toward said first position and away from said second position wherein said hook portion of said hook member as the hook portion is received in said channel portion contacts and moves said ramp member against the force of said biasing means from said first position toward said second position with said guiding means guiding the recess of said hook portion into a mating relationship with said bar.

18. The hook and catch arrangement of claim 17 further including means for biasing the recess of said hook portion and said bar in said mating relationship.

19. The hook and catch arrangement of claim 18 wherein said means for biasing said recess and bar in said mating relationship includes said ramp member.

20. The hook and catch arrangement of claim 17 wherein said ramp member supporting means supports said ramp member for pivotal movement about an axis substantially perpendicular to the axis of said channel portion.

21. The hook and catch arrangement of claim 17 wherein said first inclined angle of said ramp member in said first position is about 45 degrees to the axis of said channel portion.

22. The hook and catch arrangement of claim 17 wherein said biasing means is a substantially V-shaped spring member with said ramp member being one leg of said V-shape.

23. The hook and catch arrangement of claim 22 wherein said ramp member supporting means supports said ramp member for pivotal movement about an axis substantially at the vertex of said V-shape.

24. The hook and catch arrangement of claim 17 wherein said guiding means further includes a surface on said hook portion inclined to the axis of said hook member and contacting said bar as said hook portion is received in said channel portion and moved therealong.

25. The hook and catch arrangement of claim 17 further including a top cover member for said vehicle and means for removably attaching said side curtain to said top cover member.

* * * * *